United States Patent [19]
Kalnin et al.

[11] Patent Number: 4,707,423
[45] Date of Patent: Nov. 17, 1987

[54] ELECTRIC STORAGE BATTERY AND PROCESS FOR THE MANUFACTURE THEREOF

[75] Inventors: Ilmar L. Kalnin, Millington; Harris A. Goldberg, Colonia, both of N.J.

[73] Assignee: Celanese Corporation, New York, N.Y.

[21] Appl. No.: 387,075

[22] Filed: Jun. 10, 1982

[51] Int. Cl.$^4$ .............................................. H02M 6/36
[52] U.S. Cl. .................................. 429/112; 429/103; 429/194; 429/198
[58] Field of Search ............... 429/112, 194, 202, 204, 429/103, 198

[56] References Cited

U.S. PATENT DOCUMENTS

| | | | |
|---|---|---|---|
| 4,052,539 | 10/1977 | Shropshire et al. | 429/194 |
| 4,302,539 | 11/1981 | Evans et al. | 429/194 |
| 4,304,825 | 12/1981 | Basu | 429/112 X |

FOREIGN PATENT DOCUMENTS

| | | | |
|---|---|---|---|
| 2010991 | 10/1971 | Fed. Rep. of Germany | 429/103 |
| 2451724 | 5/1976 | Fed. Rep. of Germany | 429/198 |

*Primary Examiner*—Brian E. Hearn
*Assistant Examiner*—Stephen J. Kalafut
*Attorney, Agent, or Firm*—Burns, Doane, Swecker & Mathis

[57] ABSTRACT

The present invention provides a rechargeable electric storage battery comprising an electrolyte containing charge-transporting positive ions and negative ions capable of intercalating into graphitic carbon, and oppositely charged graphitic carbon electrodes which are simultaneously intercalated by the positive ions and negative ions present in such electrolyte. The graphitic carbon electrodes may be provided in a variety of physical configurations. Such battery is believed to provide reasonably high power density and energy density characteristics, fabrication simplicity, a relatively long lifetime, and potential economic advantages.

11 Claims, No Drawings

ELECTRIC STORAGE BATTERY AND PROCESS FOR THE MANUFACTURE THEREOF

BACKGROUND OF THE INVENTION

The present invention provides a rechargeable electric storage battery comprising oppositely charged graphitic carbon electrodes that have been simultaneously intercalated by either charge-transporting positive ions or negative ions contained in the same electrolyte. Such a battery is believed to provide reasonably high power density and energy density characteristics, fabrication simplicity, a relatively long lifetime, and potential economic advantages.

Although intense research is currently yielding new battery systems, these alternatives to conventional lead-acid batteries often suffer from serious drawbacks.

A galvanic cell wherein both electrodes consist of electron acceptor intercalated graphite compounds and the electrolyte is a solid fluoride ion conductor is disclosed in "Novel Graphite Salts of High Oxidizing Potential", Ph.D. thesis of Eugene M. McCarron, III, Lawrence Berkeley Laboratory, University of California, Materials and Molecular Research Division, August, 1980, at page 125. These electrodes undergo the following electrochemical reactions:

$$SbF_5 \cdot IG + F^- + e^+ \rightarrow SbF_6 \cdot IG, \text{ at the anode; and,}$$

$$SbF_6 \cdot IG + e^- \rightarrow SbF_5 \cdot IG + F^-, \text{ at the cathode,}$$

where IG denotes intercalated graphite, $e^-$ denotes an electron, $e^+$ denotes a hole. However, because both graphite electrodes are intercalated with electron acceptor compounds, this leads to disappointingly low observed voltages of 0.4–0.5 V.

Graphite has also been intercalated anodically through oxidation from highly concentrated strong acids such as $H_2SO_4$ and $HSO_3F$. See, Bottomley et al, *Journal of the American Chemical Society*, 1963 at page 5674; and, Besenhard et al, *Carbon*, v. 18, pp. 399-405 (1980). No intercalation at the cathode is reported in these works.

U.S. Pat. Nos. 3,956,194 and 4,041,220 disclose electrochemical generators wherein the anode consists of an alkali metal, the cathode comprises alkali metal intercalated into an electron acceptor intercalated graphite compound, and the electrolyte may be a solid alkali metal or an organic solvent. The following electrochemical reactions occur at the electrodes:

$$Na \rightarrow Na^+ + e^-, \text{ at the anode; and,}$$

$$Na^+ + FeCl_3 \cdot IG \rightarrow NaFeCl_3 \cdot IG + e^+, \text{ at the cathode,}$$

where IG, $e^-$, and $e^+$, are defined as before. As with prior art batteries wherein the anode is an alkali metal and the cathode is an electron acceptor intercalated graphite compound (see, e.g., U.S. Pat. Nos. 4,052,539 and 4,119,655), these battery systems suffer from disadvantages inherent in the use of an alkali metal as an electrode. Such disadvantages include the substantial absence of the ability to be recharged, and inherent safety hazards.

It is now known that certain doped polymers such as polyacetylene and polyphenylene can be employed as electrodes in socalled organic batteries. (See, e.g., U.S. Pat. No. 4,321,114.) However, polyacetylene is extremely sensitive to air, and both even when doped possess very low current carrying capabilities which require the use of a current carrying support backing.

In contrast to the aforementioned prior art electric storage battery systems, the battery provided by the present invention is not only rechargeable, but exhibits enhanced charge storage capability, uncomplicated electron-ion exchange kinetics, stability during the charge-discharge cycle even at elevated temperatures, fabrication simplicity, a relatively long lifetime, and potential economic advantages.

According to the present invention, a battery with highly satisfactory physical properties is produced by simultaneously intercalating two oppositely charged graphitic electrodes from the same electrolyte.

It is an object of the present invention to provide an electric storage battery wherein no solids are deposited and redissolved during charge-discharge cycles.

It is an object of the present invention to provide an electric storage battery wherein the graphitic electrodes provide their own structural and conductive integrity without the need for support backing.

It is a further object of the present invention to provide a process for the production of an electric storage battery having oppositely charged graphitic electrodes simultaneously intercalated by charge-transporting anions and cations contained in the same electrolyte.

These and other objects and advantages will be apparent to those skilled in the art from the following detailed description and appended claims.

SUMMARY OF THE INVENTION

The electric storage battery of the present invention comprises:

(a) an electrolyte containing charge-transporting positive ions and negative ions wherein the positive ions and negative ions are capable of intercalating graphitic carbon; and (b) a cathode and an anode comprising graphitic carbon having a configuration selected from the group consisting of fibrous graphitic materials, particulate graphitic materials, and mixtures thereof, wherein the cathode and anode are capable of being simultaneously intercalated with the positive ions and negative ions respectively.

The present invention also provides a process for preparing an electric storage battery through the simultaneous intercalation of oppositely charged graphitic carbon electrodes with charge-transporting positive ions and negative ions which are present in the same electrolyte.

DETAILED DESCRIPTION OF PREFERRED EMBODIMENTS

Graphitic Carbon Configurations

Possible configurations of electrically conducting graphitic carbon electrodes to be utilized in the electric storage battery of the present invention include woven, non-woven, knitted, and braided graphitic fabrics, short graphitic fibers in the form of felts, mats, or paper, multifilamentary graphitic fiber bundles such as yarns, tows, and strands, compressed particulate graphite, exfoliated graphitic particulate material, and mixtures thereof.

Preferred graphitic fibers are disclosed in U.S. Pat. Nos. 3,775,520, 3,818,082 and 3,900,556, the contents of which are hereby incorporated by reference. A particularly preferred graphitic carbon is disclosed in commonly assigned U.S. Ser. No. 017,006, filed Mar. 2, 1979, of Ilmar L. Kalnin entitled "Intercalation of Graphitic Carbon Fibers", the contents of which is hereby incorporated by reference.

The present invention also contemplates forming the electrodes from mixtures of fibrous and particulate graphitic carbon. In a preferred embodiment the electrodes are in the form of a composite article comprising graphitic fibrous materials dispersed in a matrix of particulate graphite with the graphitic fibrous material being substantially aligned in the composite article in the direction of current flow. A conventional binder coupled with compression and heating may be used to aid in imparting structural integrity to the resulting composite article.

Intercalation of the Electrodes

As is well known, graphite is a layered compound which is capable of undergoing intercalation by a variety of substances due to the large interplanar spacing between consecutive basal planes of carbon atoms. This structure permits the insertion, also known as intercalation, of relatively large molecules between the basal planes of the crystal lattice of the graphitic carbon. Although much research has been devoted to the intercalation of graphite electrodes with neutral or charged molecules which can readily exchange charges (either holes or electrons) with graphite, we have unexpectedly discovered that two oppositely charged graphite electrodes can be simultaneously intercalated by charge-transporting positive ions and negative ions present in the same electrolyte to yield a relatively high potential difference of approximately 1.5 to 4.1 volts.

The Electrical Storage Battery of the Present Invention

In one embodiment, two graphitic electrodes are placed in a non-aqueous electrolyte solution that comprises a solution of a salt of an intercalatable positive ion and negative ion dissolved in a non-aqueous solvent. The preferred electrolyte is tetraethylammonium fluoborate dissolved in acetonitrile. However, it is not necessary for both intercalating ions to be derived from a single salt. A mixture of salts, soluble in the non-aqueous solvent is permissible so long as any non-intercalating ions do not interfere with charge transfer.

Charge transporting positive ions useful in the present invention include any positively charged ions capable of forming electron acceptor intercalating compounds with graphite. Such positive ions include alkali metals such as $Li^+$, $Na^+$, $K^+$, $Rb^+$ and $Cs^+$; alkaline earth metals such as $Ca^{++}$, $Sr^{++}$ and $Ba^{++}$; tetraalkylammonium ions such as $(CH_3)_4N^+$, $(C_2H_5)_4N^+$, and $(C_3H_7)_4N^+$; and $CrO_2^+$.

Charge transporting negative ions useful in the present invention include any negatively charged ion capable of forming electron donor intercalated compounds with graphite. Such negative ions include $HSO_4^-$, $SO_4^{--}$, $NO_3^-$, $ClO_4^-$, $AsF_6^-$, $SbF_6^-$, $BF_4^-$, $AlF_4^-$, $SbCl_6^-$, and $Br^-$.

Suitable non-aqueous solvents include acetonitrile, propylene carbonate, dimethylsulfoxide, arsenic trifluoride, and mixtures thereof.

In another embodiment, two graphitic electrodes are placed into a molten salt where each ion in the molten salt is capable of intercalating graphite. Such molten salts include $LiNO_3$, $NaNO_3$, $KNO_3$, $LiClO_4$, $NaClO_4$, $LiHSO_4$, $KHSO_4$, $(C_4H_9)_4NBF_4$, $(C_6H_{13})_4NBF_4$, $(C_4H_9)_4NBr_3$, $KBr\text{-}CuBr$, and mixtures thereof. Preferred mixtures of molten salts wherein all of the ionic species intercalate graphitic carbon are $(KNO_3)_{0.5}$- $(NaNO_3)_{0.5}$, and $(LiNO_3)_{0.3}(NaNO_3)_{0.17}(KNO_3)_{0.53}$. Other mixtures of molten salts wherein less than all ionic species present are capable of intercalating graphite are also contemplated by the present invention so long as the non-intercalating ions do not interfere with the required charge transference.

Upon the application of a potential across the two oppositely charged graphitic carbon electrodes, the cathode and anode are simultaneously intercalated, each with the positive ion or negative ion respectively. The threshold potential for such unexpected simultaneous intercalation is approximately 0.5 to 1 volt, depending upon the specific eletrolyte selected.

Upon discharge, an electric storage battery of the present invention utilizing yarn electrodes of graphitic fibrous material has been found to provide an open circuit voltage of 1.3 to 4.1 volts and a short circuit current of 85 mA. or more. The cell may be recharged repeatedly without damage to the fiber electrodes.

The following Example is presented as a specific illustration of the invention. It should be understood, however, that the invention is not limited to the specific details set forth in the Example.

EXAMPLE

The test battery was a simple two electrode cell comprising a Pyrex glass bulb with four substantially vertical sidearms with each disposed about the equator of the bulb at 90° arcs from each of the two adjacent sidearms. Suspended within each pair of non-adjacent sidearms was a fibrous graphitic 384 filament yarn of approximately 30 cm. in length to serve as the respective electrodes. The two yarns did not intersect while present in the bulb. Such a test cell geometry permitted heat cleaning of the yarns, introduction and maintenance of the electrolyte under anhydrous conditions, and testing at different temperatures if desired.

The central bulb was degassed by heating with a hot air blower, was backfilled with dry nitrogen gas, and was filled with approximately 30 cm.$^3$ of a saturated solution of $(C_2H_5)_4NBF_4$ in acetonitrile which served as the electrolyte. The fibrous graphitic yarns were electrically connected to low melting solder joints which sealed the opening of each sidearm. The section of the graphitic yarn immersed in the electrolyte comprised the intercalatable electrodes and included about the central one-third of each yarn (i.e. approximately 5 mg. of the yarn).

The electrodes were simultaneously intercalated by the $(C_2H_5)_4N^+$ ions and $BF_4^-$ ions contained in the electrolyte by the application of a voltage of approximately 3 to 4 V. The electrode potentials were set and monitored across the test battery by a potentiostat, PAR Model No. 173.

After the desired amount of charge was applied to the test battery, or when the potential of the test battery had risen to where side reactions involving the electrolyte were observed, the battery was allowed to discharge through a high resistance voltmeter. This voltage, an estimation of the open circuit voltage, was measured to be 4.1 volts.

The test battery was put through 4 such charge-discharge cycles without any observable change or damage to the fibrous electrodes.

The resistance of each fibrous electrode yarn was measured before and after intercalation to gain information concerning the extent of the electrochemical intercalation which occured during charging. The intercalation was accompanied by a significant drop in the electrical resistance. The cathode had a pre-intercalation resistance of 35.3 ohms and a post-intercalation resistance of 24.5 ohms. The anode had a pre-intercalation resistance of 35.9 ohms and a post-intercalation resistance of 28.6 ohms. These resistance drops indicated that the portion of the yarn electrode immersed in the electrolyte has been substantially intercalated.

The initial short circuit current, as measured by an ammeter connected into the external circuitry of the cell, was in the range of 80 to 85 mA. The geometric surface of the fibrous graphitic 384 filament yarn was approximately 1 cm.$^2$/cm. yarn length, and the total length of immersed yarn was approximately 10 cm. Since the yarn electrodes were not parallel, the current density was inhomogeneous and was therefor at least 8.5 mA./cm.$^2$ in some areas.

Although the invention has been described with a preferred embodiment, it is to be understood that variations and modifications may be resorted to as will be apparent to those skilled in the art. Such variations and modifications are to be considered within the purview and scope of the claims appended hereto.

We claim:

1. An electric storage battery comprising:
   (a) a non-aqueous electrolyte containing charge-transporting positive ions and negative ions wherein said positive ions and negative ions are capable of intercalating graphitic carbon; and
   (b) a cathode and an anode comprising graphitic carbon having a configuration selected from the group consisting of fibrous graphitic materials, particulate graphitic materials, and mixtures thereof, wherein said cathode and anode are capable of being simultaneously intercalated with said positive ions and negative ions respectively.

2. A battery according to claim 1 wherein said positive ions are selected from the group consisting of $Li^+$, $Na^+$, $K^+$, $Rb^+$, $Cs^+$, $Ca^{++}$, $Sr^{++}$, $Ba^{++}$, $(CH_3)_4N^+$, $(C_2H_5)_4N^+$, $(C_3H_7)_4N^+$, and $CrO_2^+$.

3. A battery according to claim 1 wherein said positive ions are $(C_2H_5)_4N^+$.

4. A battery according to claim 1 wherein said negative ions are selected from the group consisting of $HSO_4^-$, $SO_4^{--}$, $NO_3^-$, $ClO_4^-$, $AsF_6^-$, $SbF_6^-$, $BF_4^-$, $AlF_4^-$, $SbCl_6^-$, and $Br^-$.

5. A battery according to claim 1 wherein said negative ions are $BF_4^-$.

6. A battery according to claim 1 wherein said electrolyte is a molten salt.

7. A battery according to claim 6 wherein said molten salt is selected from the group consisting of $LiNO_3$, $NaNO_3$, $KNO_3$, $LiClO_4$, $NaClO_4$, $LiHSO_4$, $KHSO_4$, $(C_4H_9)_4NBF_4$, $(C_6H_{13})_4NBF_4$, $(C_4H_9)_4NBr_3$, $KBr\text{-}CuBr$, and mixtures thereof.

8. A battery according to claim 6 wherein said molten salt is selected from the group consisting of $(KNO_3)_{0.5}(NaNO_3)_{0.5}$, and $(LiNO_3)_{0.3}(NaNO_3)_{0.17}(KNO_3)_{0.53}$.

9. A battery according to claim 1 wherein said non-aqueous solvent is selected from the group consisting of acetonitrile, propylene carbonate, dimethylsulfoxide, arsenic trifluoride, and mixtures thereof.

10. A battery according to claim 1 wherein said non-aqueous solvent is acetonitrile, said positive ions are $(C_2H_5)_4N^+$, and said negative ions are $BF_4^-$.

11. A battery according to claim 1 wherein the configuration of said anode and said cathode is that of a composite article comprising graphitic fibrous materials dispersed in a matrix of particulate graphite with said graphitic fibrous materials being substantially aligned in said composite article in the direction of current flow.

* * * * *